United States Patent [19]
Farfaglia

[11] 3,939,960
[45] Feb. 24, 1976

[54] VACUUM CARTON TRANSFER APPARATUS AND METHOD

[75] Inventor: Silvio T. Farfaglia, Fulton, N.Y.

[73] Assignee: Phillips Petroleum Company, Bartlesville, Okla.

[22] Filed: Sept. 7, 1973

[21] Appl. No.: 395,029

[52] U.S. Cl................. 198/20 R; 198/32; 214/1 BT
[51] Int. Cl.² ......................................... B65G 47/52
[58] Field of Search............. 198/20 R, 32, 218, 131; 214/1 BB, 1 BT

[56] References Cited
UNITED STATES PATENTS

| | | | |
|---|---|---|---|
| 2,677,471 | 5/1954 | Skinner | 214/1 BT |
| 2,833,185 | 5/1958 | Dixon | 198/20 |
| 3,198,309 | 8/1965 | Ogawa | 214/1 BB |
| 3,225,891 | 12/1965 | Hickin et al. | 214/1 BT |
| 3,276,606 | 10/1966 | Marchand | 214/1 BB |
| 3,368,324 | 2/1968 | Leedy | 214/1 BT |
| 3,572,490 | 3/1971 | Babunovic | 198/22 |
| 3,774,778 | 11/1973 | Flaig | 214/1 BT |

*Primary Examiner*—Evon C. Blunk
*Assistant Examiner*—Jeffrey V. Nase

[57] ABSTRACT

One or more vacuum-operated suction cups are used to grip a carton and transfer it laterally from a first station on an intermittently operated conveyor to a second station on a continuously operated conveyor. Disengaging the vacuum source from the one or more suction cups deposits the container at the second station when transfer of the container is complete.

17 Claims, 4 Drawing Figures

VACUUM CARTON TRANSFER APPARATUS AND METHOD

This invention relates to the transfer of a carton from a first station on a first conveyor to a second station on a second conveyor. In another aspect, it relates to the use of one or more vacuum-operated suction cups to transfer a carton horizontally from a first station on an intermittently actuated conveyor to a second station on a continuously actuated conveyor. In another aspect, it relates to the transfer of a filled container from the conveyor of a container-filling machine to a delivery conveyor carrying filled containers away from the filling machine.

Machinery commonly employed in the filling or assembly and filling of cartons often utilizes an endless conveyor which is indexed in a stepwise manner to move the cartons through the various stages of assembly, filling, sealing, marking, and other associated operations. When these various operations have been performed by the filling machine, it is necessary to remove the filled container from the endless conveyor of the filling machine to permit the conveyor space occupied by the filled container to be reused in subsequent filling operations. Various methods and apparatus are known in the art for performing this function. Some, for example, use an arm or push rod to displace a filled carton from the endless conveyor of the filling machine. Another method is to dump the filled container from one conveyor to another or to displace it onto an incline and let it slide to another conveyor. While these methods are generally acceptable for the handling of filled cartons having a geometric configuration which will stabilize them against tipping or falling during handling operations subsequent to being filled, many tall containers with relatively small bases and containers made of a material which may tend to stick to a surface rather than to slide across it are difficult to push or gravity-slide from one location to another.

It is therefore an object of the invention to provide an improved apparatus and method for transferring a container from one location to another. It is a further object of the invention to provide an improved apparatus and method for transferring a container from one location to another using vacuum-actuated suction cups. Still a further object of the invention is to provide an improved method and apparatus for transferring filled containers from the intermittently actuated conveyor of a filling machine to a continuously actuated delivery conveyor.

The invention is particularly suited for use with flat-sided containers. It is especially useful for such containers having a relatively unstable geometric configuration or having a coating which may make them difficult to gravity-slide from one location to another. Although the invention can be used with a variety of containers containing almost any product, it is particularly well suited for use in conjunction with a machine which packages milk, orange drink, or other similar liquid in fiberboard, plastic-coated fiberboard, or plastic containers.

In accordance with the invention, each filled container arriving at a specified station along the intermittently actuated conveyor of the filling machine is contacted by one or more suction cups, to which a vacuum has been applied, an is pulled from the conveyor of the filling machine to a desired location on a continuously actuated conveyor where the source of vacuum to the suction cups is interrupted, releasing the container onto the continuously actuated conveyor.

Details of the operation of the invention are readily observable from the accompanying drawings in which FIG. 1 is an elevational view of a carton-forming, filling, and sealing machine embodying the present invention;

Figure 1:
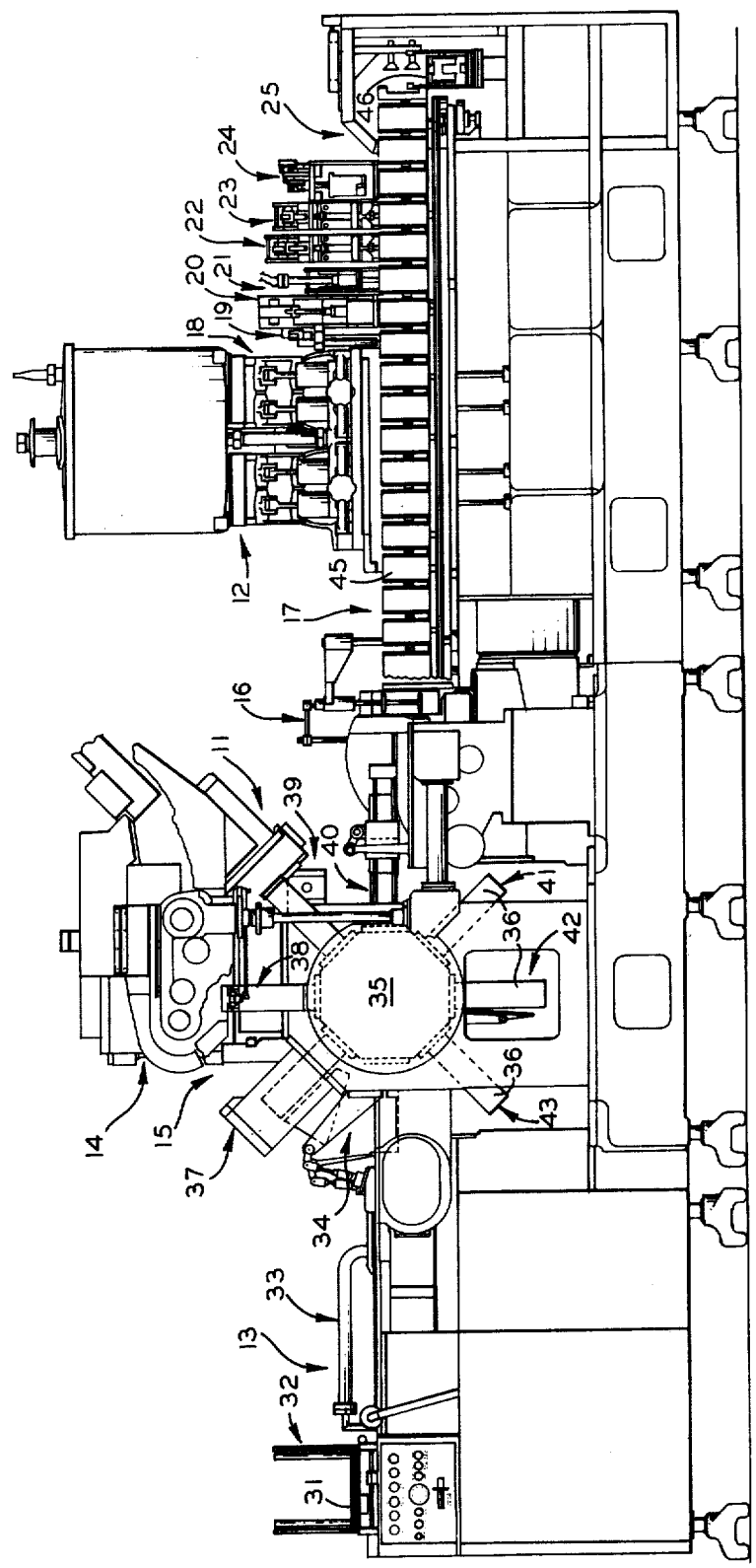

Referring now to the drawings in detail and to FIG. 1 in particular, the carton-forming, filling, and sealing machine comprises a forming section 11 and a filling and sealing section 12. The forming section 11 comprises a sidewall blank feeding and heating subsection 13, a bottom blank feeding and heating subsection 14, a forming subsection 15, and a transfer subsection 16. The filling and sealing section has two parallel endless conveyor systems 17, and each conveyor system comprises a filling subsection 18 occupying five conveyor stations, a defoaming station 19, a score breaking station 20, a top heating station 21, a folding and sealing station 22, a secondary sealing station 23, a branding station 24, and transfer mechanism 25.

The sidewall blanks 31 manually placed in the sidewall blank magazine 32 are flat, single sheets of paperboard, rectangular in shape, scored to provide five longitudinal panels and a gable-top structure, and coated on both the top and bottom surfaces of each sheet with a thermoplastic material, e.g., polyethylene. The sidewall blanks are successively withdrawn from magazine 32 and individually advanced in a stepwise fashion through the sidewall blank heating station 33 to the sidewall blank receiving station 34 for turret 35. At the sidewall blank heating station 33, the side margins to be overlapped and the bottom margin of the sidewall blank are heated to a bonding temperature for the thermoplastic coating.

The turret 35 is journalled on a horizontal axis and carries eight circumferentially spaced apart mandrels 36 extending radially from the axis of turret 35. The cross section of each of mandrels 36 in a plane perpendicular to its longitudinal axis is generally rectangular. Suitable drive mechanism is provided for indexing or effecting intermittent rotation of the turret 35 to move each mandrel from the sidewall blank receiving station 34 through a blank folding station 37; a bottom end closure forming, applying, and sealing station 38; a secondary bottom sealing station 39; a stripping station 40; and three successive nonoperating stations 41, 42, and 43.

The tubular carton body having a bottom closure sealed thereto is removed from the mandrel 36 at the stripping station 40 and is transferred to a conveyor pocket 45 of one of the two conveyor systems 17. The product to be packaged is introduced into the open-topped tubular carton in the filling subsection 18. If desired, any foam resulting from the filling operation can be removed at defoaming station 19. The scores for the gable-top structure can be initially folded in the score breaking station 20, resulting in the conventional six-sided top structure. The gable-top ridge panels of the carton are heated in station 21 to a temperature at least as high as the thermal bonding temperature of the thermoplastic coatings on the carton. The heated superstructure is then folded into contact under pressure at the folding and sealing station 22 to effect the bonding of adjacent ridge panels. Secondary sealing station 23 applies pressure to the ridge panels during cooling of the thermoplastic bond. If desired, a date indicia, plant identification or other information can be applied to the bonded ridge panels of the sealed carton at branding station 24. The formed, filled, and sealed carton is removed from its conveyor pocket 45 by the transfer mechanism 25 and placed on a delivery conveyor 46. The conveyor systems 17 are intermittently actuated to move conveyor pockets 45 from station to station in a stepwise fashion, while delivery conveyor 46 is operated continuously.

Figure 2:
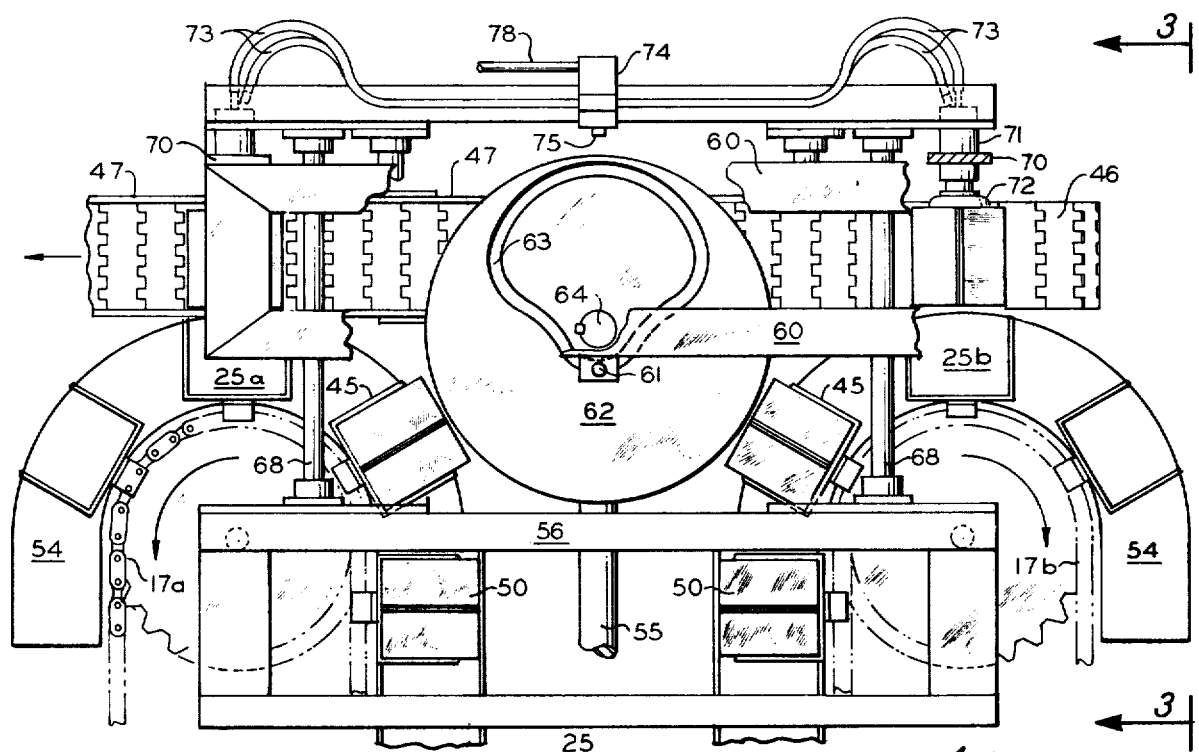
FIG. 2 is a plan view of the product discharge end of the carton-forming, filling, and sealing machine of FIG. 1 showing the operation of the present invention.

FIG. 2 illustrates a partially cutaway plan view of the transfer mechanism 25 associated with the filling and sealing section 12 of the carton-forming, filling and sealing machine of FIG. 1. Endless intermittently actuated conveyors 17a and 17b deliver filled and sealed cartons 50 to transfer stations 25a and 25b using conveyor pockets 45 to intermittently slide the cartons 50 along flat rails 54. Endless conveyors 17a and 17b are driven by a reciprocating arm, not shown, and are incrementally indexed in a manner such that two filled and sealed cartons 50 in conveyor pockets 45 are simultaneously advanced to transfer stations 25a and 25b during the advance portion of the conveyor cycle. The conveyor pockets 45 carrying the advanced cartons 50 remain at transfer stations 25a and 25b during the dwell portion of the conveyor cycle, after which the cycle repeats itself, advancing two more containers 50 the incremental distance to transfer stations 25a and 25b. The conveyors 17a and 17b and other major components of the transfer mechanism 25 are supported on the frame 56 of the carton-forming and filling machine.

Conveyor pockets 45 comprise two vertical side plates connected at angles of nominally 90° to a third vertical back plate, the vertical back plate being applied to the drive means of conveyor 17a or 17b. The U-shaped configuration of conveyor pockets 45 accurately maintains each container 50 at its proper location along conveyor 17a or 17b but also makes it necessary to remove a container from the pocket which has carried it to transfer station 25a or 25b by drawing the container away from the back plate of the pocket in a vertical direction or a horizontal direction perpendicular to the back plate, or in a combination of such vertical and horizontal directions. The configuration of the conveyor pockets negates the use of any removal technique involving displacement of the filled container 50 in a lateral direction parallel to the surface of the conveyor pocket back plate.

Flat rails 54 are positioned directly below the line of travel followed by conveyor pockets 45 and are of sufficient width that the entire bottom surface of each container can rest upon the rail during the dwell portion of the operation of intermittent conveyors 17a and 17b and slide along the rail during the moving portion of the conveyor operation. The top surfaces of both flat rails 54 are substantially in the same horizontal plane while the upper surface of conveyor 46 is preferably slightly below the plane of rails 54. Transfer stations 25a and 25b are preferably located so that a straight delivery conveyor 46 will be tangent to both rails 54 at transfer stations 25a and 25b.

Sub-frame 60, shown partially cutaway in FIG. 2 in order to more clearly show the apparatus beneath it, is rectangular in shape and is driven in a reciprocating linear (straight line) motion by cam follower 61 attached to the edge of sub-frame 60. The reciprocating linear motion of sub-frame 60 is preferably effected in an at least substantially horizontal plane although it can be carried out in a plane inclined to the horizontal reference at an angle in the range of about 1° to about 45°, more preferably in the range of about 1° to about 10°. Such an inclined plane would generally extend upwardly from the top face of rail 54 over the top surface of conveyor 46 in order to permit the container to clear the rail 54. Cam follower 61 rides in groove 63 of cam wheel 62 as cam wheel 62 is rotated by the main drive shaft 55 and cam drive shaft 64. Sub-frame 60 is supported on brackets 67 (FIG. 4) which are slidable on rods 68 attached to the main frame 56.

Sub-frame 60 has attached to its bottom portion, at each end, a bracket 70, each of which carries two vacuum cup mounts 71. Each vacuum cup mount 71 has connected to it a vacuum cup 72 for contacting the filled and sealed cartons 50 at the adjacent transfer station. Vacuum cups 72 are connected to a suitable source of vacuum 78 through vacuum cup mounts 71, vacuum lines 73, and vacuum valve 74. On its rear edge, sub-frame 60 has an adjustable stop 65 (FIG. 3) which contacts actuating means 75 of vacuum valve 74 at one end of the reciprocating stroke of sub-frame 60.

The delivery conveyor 46 located at a right angle to the center line of the packaging machine is tangent to the curved paths of conveyors 17a and 17b and is adjacent to both transfer stations 25a and 25b to carry filled cartons away from transfer mechanism 25. Guide rails 47 extend above the surface of delivery conveyor 46 to guard against containers being improperly positioned on, or falling from, conveyor 46 and are attached to support bar 48 (FIG. 3) which is in turn attached to the main frame 56 of the carton-forming, filling and sealing machine. The top of conveyor 46 is preferably slightly lower than the top of flat rails 54 to permit container 50 to be moved laterally from transfer stations 25a and 25b without contacting the surface of conveyor 46.

Figure 3:
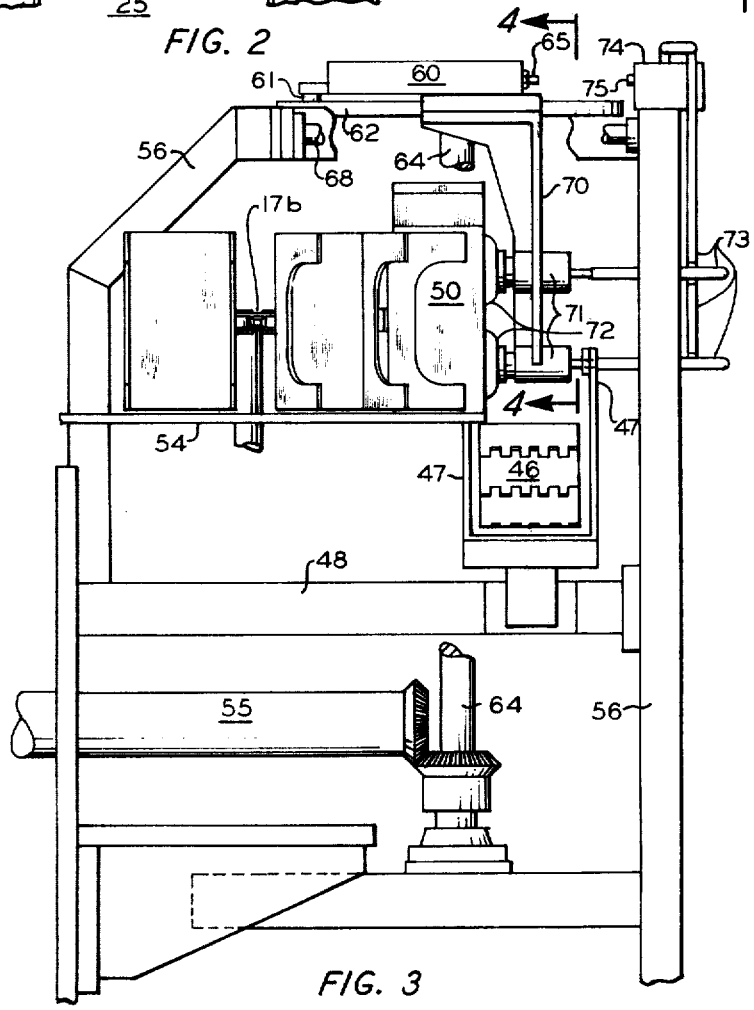
FIG. 3 is a simplified elevational view of the present invention.

FIG. 3 is a simplified elevational view of transfer station 25b with sub-frame 60 in its extreme forward position. In this position, vacuum cups 72 are in contact with the side of the container 50 at transfer station 25b, and adjustable stop 65 has been released from contact with actuating means 75 of vacuum valve 74, thus causing vacuum to be applied through vacuum lines 73 and vacuum cup mounts 71 to vacuum cups 72.

Figure 4:
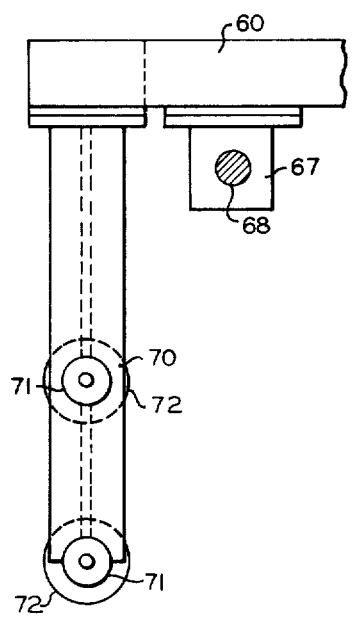
FIG. 4 is an elevational view illustrating the mounting of suction cups on the sub-frame of the present invention.

FIG. 4 illustrates the connection of bracket 70 and bracket 67 to sub-frame 60. Rod 68 is fitted to the hole in bracket 67 in such a way as to provide both support for sub-frame 60 and a guide for the reciprocating motion of sub-frame 60. Vacuum cup mounts 71 are attached to bracket 70 so that vacuum cups 72 are preferably located one above the other and spaced to permit gripping of a filled container 50 near the top and near the bottom of a flat, vertical side of the container.

In operation, filled and sealed cartons are delivered by each conveyor 17a and 17b to transfer stations 25a and 25b simultaneously. The indexing motion of the conveyor 17a and 17b stops the conveyor pockets 45 at the transfer stations 25a and 25b. During the interval that the conveyors are stopped, cam wheel 62 makes one complete revolution. At the start of the rotation of cam wheel 62, the sub-frame 60 is in the rear position with the stop 65 contacting actuating means 75 of vacuum valve 74, thereby interrupting the vacuum supply to vacuum cups 72. As cam wheel 62 rotates, the sub-frame 60 moves forward, releasing actuating means 75 and activating vacuum valve 74, thereby applying a vacuum to the vacuum cups 72 through vacuum lines 73. As the sub-frame 60 reaches the end of its forward motion, the vacuum cups 72 contact and grip the sides of filled cartons 50 located at transfer stations 25a and 25b. As the sub-frame 60 begins its backward motion, vacuum cups 72 carry the respective cartons 50 from the transfer stations 25a and 25b backward to a position above the delivery conveyor 46. At this point the bottoms of the cartons 50 are slightly above the surface of the delivery conveyor 46. As the sub-frame 60 reaches the end of its backward movement, stop 65 contacts actuating means 75 of vacuum valve 74 and interrupts the supply of vacuum to vacuum cups 72 allowing the filled cartons 50 from transfer stations 25a and 25b to drop onto delivery conveyor 46 and be carried away. Conveyors 17a and 17b than advance two more filled and sealed cartons to transfer stations 25a and 25b, and the cycle removing the cartons 50 from transfer stations 25a and 25b to delivery conveyor 46 is repeated.

The apparatus of the invention can be made from materials known in the art. Steel, for example, can be used for the frame 56, sub-frame 60, cam follower 61, cam wheel 62, cam drive shaft 64, main drive shaft 55, and other similar structural members of the apparatus. Stainless steel is preferred for conveyor pockets 45 and flat rails 54, where a smooth and corrosion-free surface is particularly desired for contact with the cartons 50. Natural or synthetic rubber or other similar flexible plastic materials are suitable for construction of vacuum cups 72 with synthetic rubber being preferred. Vacuum line 73 can be constructed of reinforced, non-collapsible rubber, plastic, or other similar flexible material, or can be constructed of a combination of rigid and flexible tubing, with the flexible tubing being located adjacent to vacuum cup mounts 71 in order to provide a continuous flexible vacuum supply to vacuum cup 72 during the reciprocating movement of sub-frame 60, brackets 70, vacuum cup mounts 71, and vacuum cups 72. In order to prevent the collapse of the tubing and consequential interruption of the vacuum supply to vacuum cups 72, the tubing used must be capable of withstanding the application of the vacuum used without collapse.

Although the invention has been illustrated in a preferred embodiment employing two vacuum cups to grip each carton transferred with a substantially air-tight seal, the invention is suitable for use with one vacuum cup gripping each carton or can employ more than two vacuum cups to grip each carton.

Reasonable variations and modifications are possible within the scope of the foregoing disclosure and the appended claims to the invention.

What is claimed is:

1. Apparatus comprising:
   an intermittently actuated conveyor for moving a container to a first station located thereon;
   a continuously actuated conveyor having a second station located immediately above a portion of a continuously moving surface thereof; and
   transfer means for moving a container from said first station to said second station, said transfer means comprising
      one or more suction cup means for producing a substantially air-tight seal with a generally vertical side surface of the container to be transferred,
      vacuum supply means operably connected to said one or more suction cup means for providing a vacuum thereto,
      reciprocating means for moving said one or more suction cup means in a generally horizontal straight line from a first position at which contact is made by said suction cup means with said side surface of a container located at said first station to a second position at which said container is released by said suction cup means at said second station, and
      vacuum control means interposed between said vacuum supply means and said one or more suction cup means for applying a vacuum to said one or more suction cup means when said reciprocating means is in said first position and traveling between said first position and said second position and for interrupting the vacuum supply to said one or more suction cup means in response to arrival of said reciprocating means at said second position.

2. The apparatus of claim 1 wherein said intermittently acutated conveyor comprises a plurality of U-shaped conveyor pockets having vertical back and side sections traveling above a stationary flat rail upon which the bottom of said container rests.

3. Apparatus in accordance with claim 2 wherein said flat rail of said intermittently actuated conveyor is higher than said continuously moving surface of said continuously actuated conveyor.

4. Apparatus in accordance with claim 3 wherein said reciprocating means comprises means for moving said one or more suction cup means perpendicular to said generally vertical side surface of said container.

5. Apparatus in accordance with claim 4 wherein said first station is located on a curved portion of said intermittently actuated conveyor and said second station is located immediately above a straight portion of said continuously actuated conveyor.

6. Apparatus in accordance with claim 1 wherein said first station is located on a curved portion of said intermittently actuated conveyor and said second station is located immediately above a straight portion of said continuously actuated conveyor.

7. Apparatus in accordance with claim 6 wherein said intermittently actuated conveyor comprises a plurality of U-shaped conveyor pockets having vertical back and side sections traveling above a stationary flat rail upon which the bottom of said container rests.

8. Apparatus in accordance with claim 7 wherein said reciprocating means comprises means for moving said one or more suction cup means perpendicular to said generally vertical side surface of said container.

9. Apparatus in accordance with claim 8 wherein said flat rail of said intermittently actuated conveyor is higher than said continuously moving surface of said continuously actuated conveyor.

10. Apparatus in accordance with claim 9 wherein each said conveyor pocket of said intermittently actuated conveyor comprises two vertical side plates connected at angles of about 90° to a third vertical back plate.

11. A method of transferring a container from a first conveyor to a second conveyor, comprising moving a container to a first station on said first conveyor in a series of intermittent steps, contacting a generally vertical side surface of said container on said first conveyor at said first station with one or more suction cups;

applying a vacuum to said suction cups to adhere said generally vertical side of said container to said one or more suction cups, moving said one or more suction cups and said container in a generally horizontal straight line from the point at which said side surface is contacted by said one or more suction cups to place said container at a second station immediately above a continuously moving surface of said second conveyor, releasing the vacuum applied to said one or more suction cups immediately upon arrival of said container at said second station thereby releasing said container at said second station onto said continuously moving surface, and removing said container from said second station by means of said continuously moving surface.

12. A method in accordance with claim 11 additionally comprising returning said one or more suction cups to said first station.

13. A method in accordance with claim 11 wherein moving said container to said first station comprises intermittently actuating said first conveyor and stopping said first conveyor when a container is located at said first station, and wherein transporting said container from said second station comprises continuously actuating said second conveyor.

14. A method in accordance with claim 11 wherein moving said one or more suction cups and said container in a generally horizontal straight line to said second station comprises moving said one or more suction cups perpendicular to said generally vertical side surface of said container.

15. A method in accordance with claim 14 wherein said first station comprises a U-shaped conveyor pocket having vertical side and back plates with a container located at said first station being within said U-shaped conveyor pocket between said vertical side plates, and wherein moving said one or more suction cups and said container perpendicular to said generally vertical side surface of said container comprises moving said one or more suction cups and said container in a direction perpendicular to said vertical back plate.

16. A method in accordance with claim 14 additionally comprising simultaneously moving two said containers from two said first stations to two said second stations immediately above said continually moving surface of said second conveyor.

17. Apparatus comprising:

two intermittently actuated conveyor means for moving containers to two respective first stations located on a curved portion of each said intermittently actuated conveyor, each said intermittently actuated conveyor comprising a plurality of U-shaped conveyor pockets having vertical back and side sections traveling above a stationary flat rail upon which the bottom of the conveyed containers rest;

a straight, continuously actuated conveyor having a continuously moving surface which is lower than the respective flat rails of the intermittently actuated conveyors, said continuously actuated conveyor being tangent to the curved portions of the two said intermittently actuated conveyors and having two second stations located above a portion of said continuously moving surface thereof adjacent said first stations of said intermittently actuated conveyors;

a pair of transfer means for moving containers from said first stations to said second stations, each said transfer means comprising one or more suction cups capable of producing a substantially air-tight seal with the surface of the container to be transferred;

a reciprocating sub-frame for moving said pair of transfer means in a horizontal direction perpendicular to the vertical back sections of conveyor pockets located at said first stations to thereby move the said one or more suction cups of each respective transfer means between a first position in contact with the surfaces of a container located at said first station and a second position in contact with the surface of a container located at said second station;

a vacuum supply means operably connected to said one or more suction cups of each said transfer means for providing a source of vacuum thereto; and vacuum control means interposed between said vacuum supply means and said suction cups for applying a vacuum to said suction cups while said sub-frame is in said first position and traveling between said first position and said second position and to interrupt the vacuum supply to said suction cups while said reciprocating means is in said second position.

* * * * *